United States Patent
Asif Bashir et al.

(10) Patent No.: US 11,417,356 B1
(45) Date of Patent: Aug. 16, 2022

(54) WRITE ASSIST STACK TO REDUCE RESISTANCE AND IMPROVE RELIABILITY

(71) Applicant: Western Digital Technologies, Inc., San Jose, CA (US)

(72) Inventors: Muhammad Asif Bashir, San Jose, CA (US); Alexander Goncharov, Morgan Hill, CA (US); Petrus Antonius Van Der Hemden, Cupertino, CA (US); Aron Pentek, San Jose, CA (US); Yi Zhang, Redwood City, CA (US); Venkatesh Chembrolu, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/917,487

(22) Filed: Jun. 30, 2020

Related U.S. Application Data

(60) Provisional application No. 62/873,747, filed on Jul. 12, 2019.

(51) Int. Cl.
| | | |
|---|---|---|
| G11B 5/31 | (2006.01) | |
| G11B 5/55 | (2006.01) | |
| G11B 5/127 | (2006.01) | |
| G11B 5/23 | (2006.01) | |
| G11B 5/235 | (2006.01) | |
| G11B 5/187 | (2006.01) | |

(52) U.S. Cl.
CPC .......... *G11B 5/5539* (2013.01); *G11B 5/1278* (2013.01); *G11B 5/187* (2013.01); *G11B 5/23* (2013.01); *G11B 5/235* (2013.01); *G11B 5/3116* (2013.01); *G11B 5/3146* (2013.01)

(58) Field of Classification Search
None
See application file for complete search history.

(56) References Cited

U.S. PATENT DOCUMENTS

| | | | | |
|---|---|---|---|---|
| 8,320,079 B2 * | 11/2012 | Iwasaki | ................. | B82Y 25/00 360/125.71 |
| 8,472,135 B1 | 6/2013 | Kusukawa et al. | | |

(Continued)

OTHER PUBLICATIONS

Tagawa et al. "Advantage of MAMR Read-Write Performance," IEEE Transactions on Magnetics, vol. 52, No. 9, Sep. 2016, 4 pages.

*Primary Examiner* — Jefferson A Evans
(74) *Attorney, Agent, or Firm* — Patterson + Sheridan, LLP; Steven H. VerSteeg

(57) ABSTRACT

The present disclosure generally relates to a magnetic media drive employing a magnetic recording head. The magnetic recording head comprises a main pole, a hot seed layer, and a write assist stack disposed between the main pole and the hot seed layer. In one embodiment, the write assist stack comprises a seed layer, a spin torque layer, and a notch layer. One or more of the seed layer and the notch layer have a first cross-track width and the spin torque layer has a second cross-track width less than the first cross track width. In another embodiment, the write assist stack comprises a seed layer, a spin polarization layer, and a notch layer. One or more of the seed layer and the notch layer have a first cross-track width and the spin polarization layer has a second cross-track width less than the first cross track width.

26 Claims, 12 Drawing Sheets

(56) References Cited

U.S. PATENT DOCUMENTS

| | | | |
|---|---|---|---|
| 8,537,497 B2* | 9/2013 | Nagasaka | H01L 43/08 |
| | | | 360/125.3 |
| 8,582,240 B1 | 11/2013 | Chen et al. | |
| 8,937,789 B2* | 1/2015 | Watanabe | G11B 5/147 |
| | | | 360/122 |
| 8,970,996 B2* | 3/2015 | Nagasaka | G11B 5/314 |
| | | | 360/324 |
| 8,995,088 B1* | 3/2015 | Boone | G11B 5/3136 |
| | | | 360/125.32 |
| 9,007,723 B1 | 4/2015 | Igarashi et al. | |
| 9,202,528 B2 | 12/2015 | Furukawa et al. | |
| 9,230,569 B1* | 1/2016 | Shimoto | G11B 5/147 |
| 9,230,571 B1 | 1/2016 | Chen et al. | |
| 9,672,846 B1 | 6/2017 | Tanaka et al. | |
| 9,691,416 B1 | 6/2017 | Izawa et al. | |
| 9,805,746 B1* | 10/2017 | Okamura | G11B 5/235 |
| 10,037,772 B2* | 7/2018 | Okamura | G11B 5/235 |
| 10,643,643 B1* | 5/2020 | Gao | G11B 5/235 |
| 10,706,877 B2* | 7/2020 | Goncharov | G11B 5/11 |
| 10,714,129 B1* | 7/2020 | Tang | G11B 5/115 |
| 10,734,015 B1* | 8/2020 | Song | G11B 5/315 |
| 10,811,034 B1* | 10/2020 | Wu | G11B 5/3143 |
| 10,832,707 B1* | 11/2020 | Chen | G11B 5/312 |
| 10,867,626 B1* | 12/2020 | Li | G11B 5/1278 |
| 10,891,975 B1* | 1/2021 | Bai | G11B 5/1278 |
| 11,011,193 B1* | 5/2021 | Wu | G11B 5/2455 |
| 11,043,232 B1* | 6/2021 | Wu | G11B 5/3146 |
| 11,227,627 B1* | 1/2022 | Song | G11B 5/1278 |
| 11,289,118 B1* | 3/2022 | Kaiser | G11B 5/3146 |
| 2009/0052095 A1* | 2/2009 | Yamada | G11B 5/1278 |
| | | | 360/324 |
| 2011/0096443 A1 | 4/2011 | Zhang et al. | |
| 2012/0126905 A1* | 5/2012 | Zhang | H01L 43/08 |
| | | | 427/130 |
| 2013/0027803 A1 | 1/2013 | Tanabe et al. | |
| 2020/0312354 A1* | 10/2020 | Wu | G11B 5/455 |
| 2021/0407534 A1* | 12/2021 | Freitag | G11B 5/23 |

\* cited by examiner

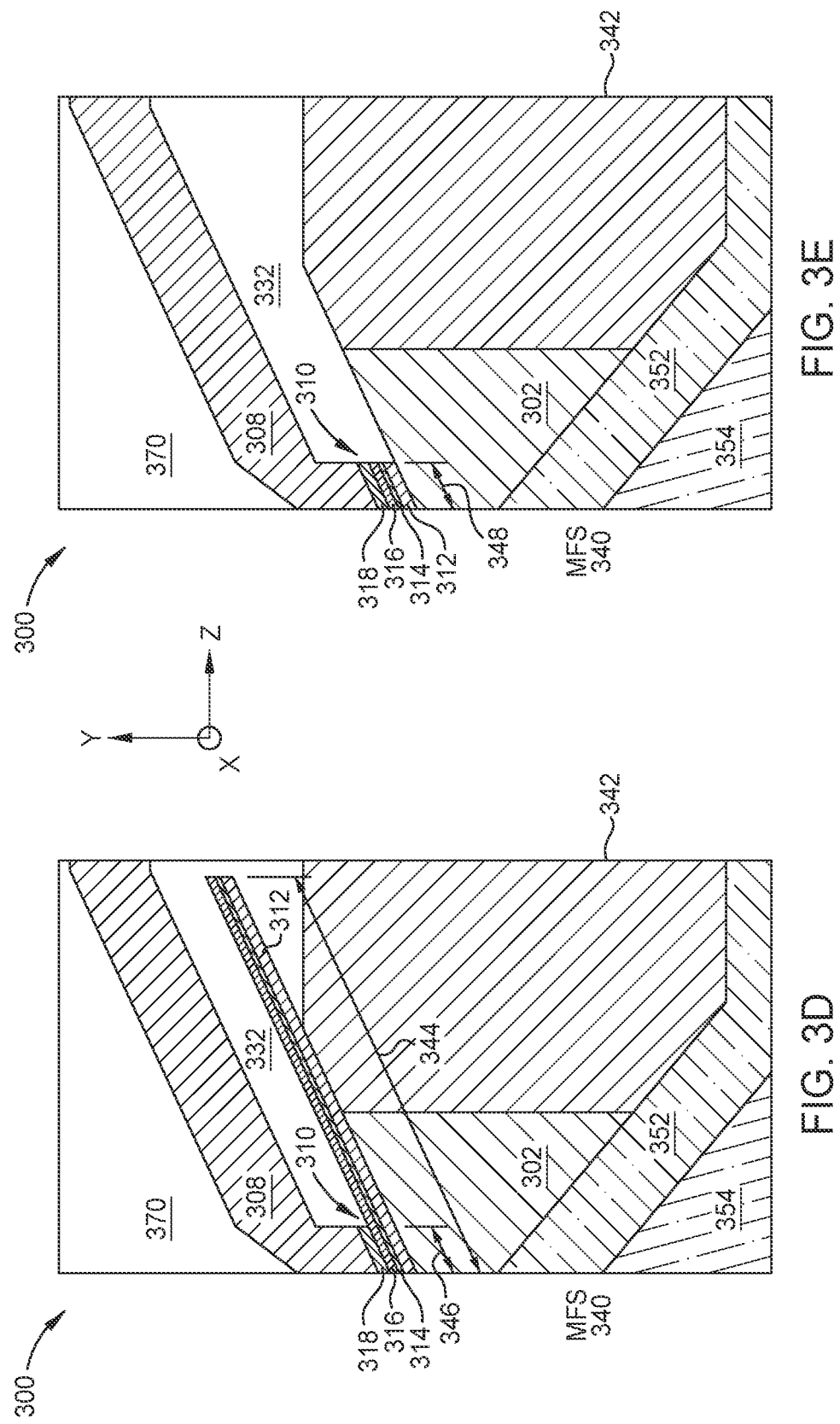

WRITE ASSIST STACK TO REDUCE RESISTANCE AND IMPROVE RELIABILITY

CROSS-REFERENCE TO RELATED APPLICATIONS

This application claims benefit of U.S. provisional patent application Ser. No. 62/873,747, filed Jul. 12, 2019, which is herein incorporated by reference.

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, in HDD designs where a current applied through the magnetic recording head is used to write data to media, higher amounts of current being applied to the magnetic recording head cause the temperature and resistance of the magnetic recording head to increase. Due to the amount of heat being generated, the current flowing through the magnetic recording head can cause the main pole of the magnetic recording head to degrade at the media facing surface (MFS). As the main pole degrades at the MFS, the performance and reliability of the magnetic recording head decreases. As the current causes the magnetic recording head to increasingly heat up, the magnetic recording head may eventually deform or break down, rendering the magnetic recording head inoperable. Thus, many magnetic recording heads are unable to handle larger amounts of current without breaking down.

Therefore, there is a need in the art for an improved magnetic recording head design.

SUMMARY OF THE DISCLOSURE

The present disclosure generally relates to a magnetic media drive employing a magnetic recording head. The magnetic recording comprises a main pole, a hot seed layer, and a write assist stack disposed between the main pole and the hot seed layer. In one embodiment, the write assist stack comprises a seed layer, a spin torque layer, and a notch layer. One or more of the seed layer and the notch layer have a first cross-track width and the spin torque layer has a second cross-track width less than the first cross track width. In another embodiment, the write assist stack comprises a seed layer, a spin polarization layer, and a notch layer. One or more of the seed layer and the notch layer have a first cross-track width and the spin polarization layer has a second cross-track width less than the first cross track width.

In one embodiment, a magnetic recording head comprises a main pole, a hot seed layer disposed above the main pole, and a write assist stack disposed between and in contact with the main pole and the hot seed layer. The write assist stack comprises a notch layer having a first cross-track width and a first layer having a second cross-track width. The first cross-track width is greater than the second cross-track width. The first layer comprises a spin torque material or a non-magnetic, electrically conductive material.

In another embodiment, a magnetic recording head comprises a main pole, a hot seed layer disposed above the main pole, and a write assist stack disposed between and in contact with the main pole and the hot seed layer. The write assist stack comprises a seed layer having a first cross-track width and a spin polarization layer having a second cross-track width. The first cross-track width is greater than the second cross-track width.

In yet another embodiment, a magnetic recording head comprises a main pole, a hot seed layer disposed above the main pole, and a write assist stack disposed at a media facing surface between and in contact with the main pole and the hot seed layer. The write assist stack comprises a seed layer having a first cross-track width and a spin polarization layer having a second cross-track width. The first cross-track width is greater than the second cross-track width. The magnetic recording head further comprises an electrically insulating layer disposed adjacent to the write assist stack between the hot seed layer and the main pole, the electrically insulating layer comprising a non-conductive material. The electrically insulating layer is recessed from the media facing surface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3E illustrate various views of magnetic recording heads having spin torque oscillators comprised of layers of varying widths, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic media drive employing a magnetic recording head. The magnetic recording comprises a main pole, a hot seed layer, and a write assist stack disposed between the main pole and the hot seed layer. In one embodiment, the write assist stack comprises a seed layer, a spin torque layer, and a notch layer. One or more of the seed layer and the notch layer have a first cross-track width and the spin torque layer has a second cross-track width less than the first cross track width. In another embodiment, the write assist stack comprises a seed layer, a spin polarization layer, and a notch layer. One or more of the seed layer and the notch layer have a first cross-track width and the spin polarization layer has a second cross-track width less than the first cross track width.

Figure 1:
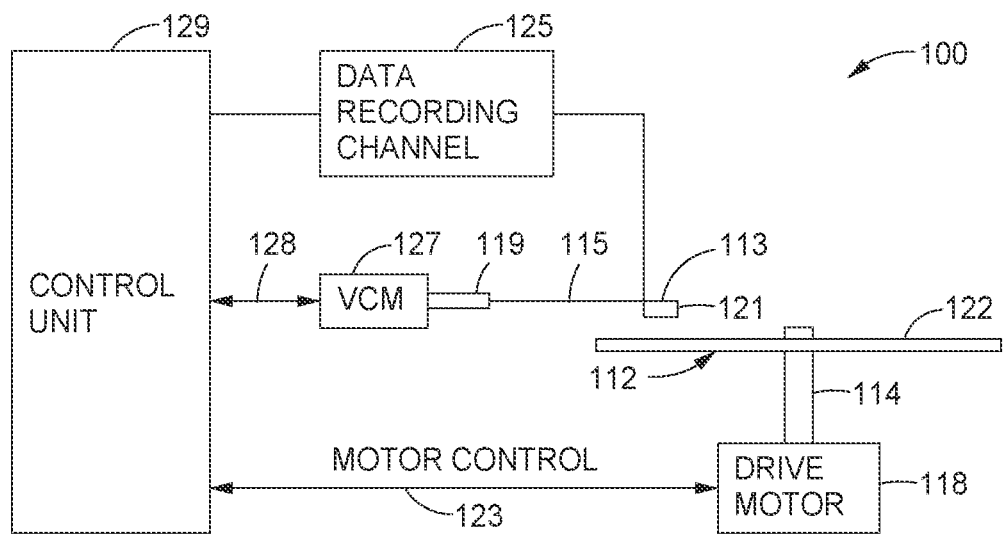
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
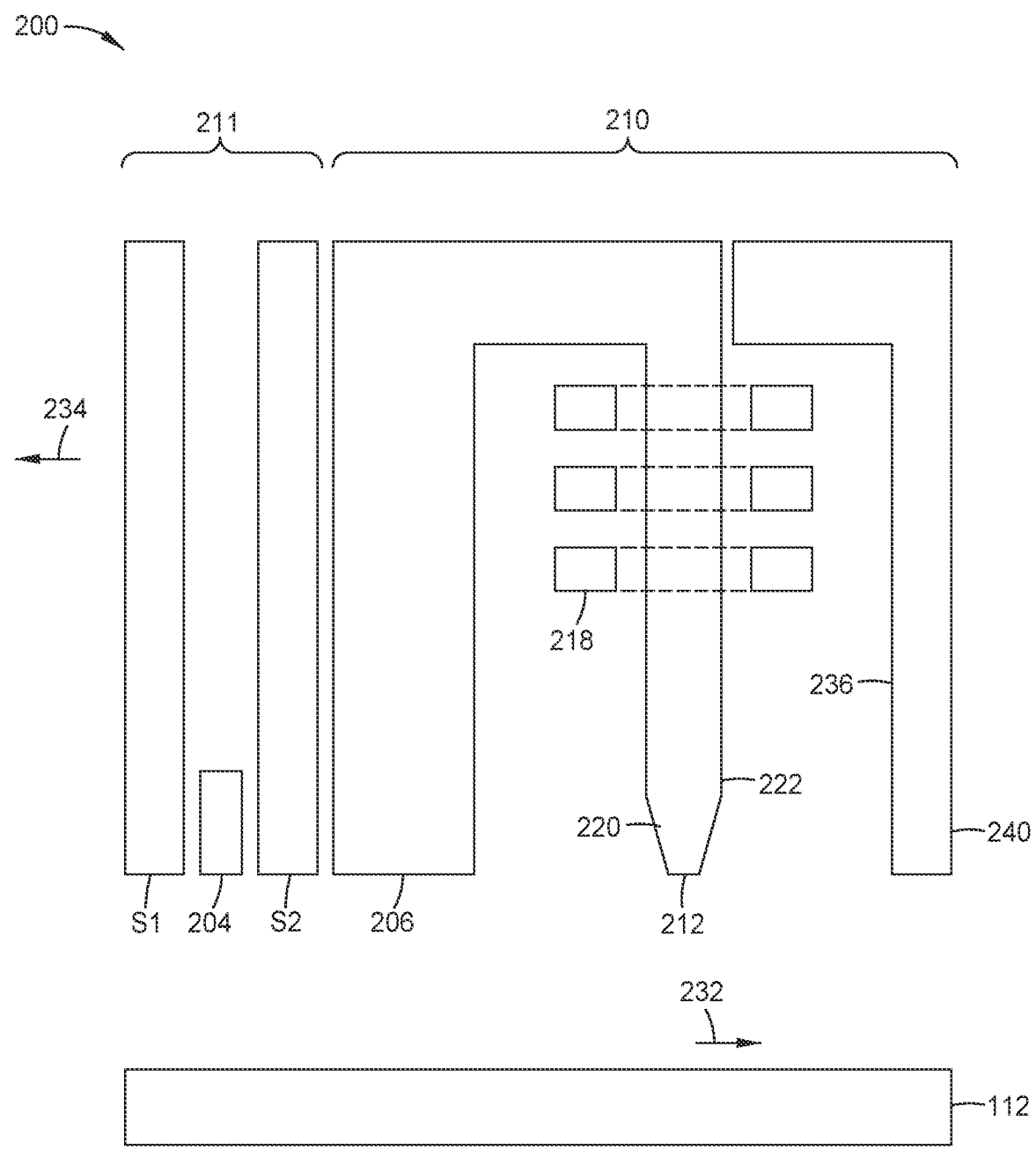
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head, such as a microwave-assisted magnetic recording (MAMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe and Ni. The trailing shield 240 may be a magnetic material such as NiFe alloy. In one embodiment, the trailing shield 240 has an Ms of about 1.2 T to about 1.6 T.

Figure 3A:
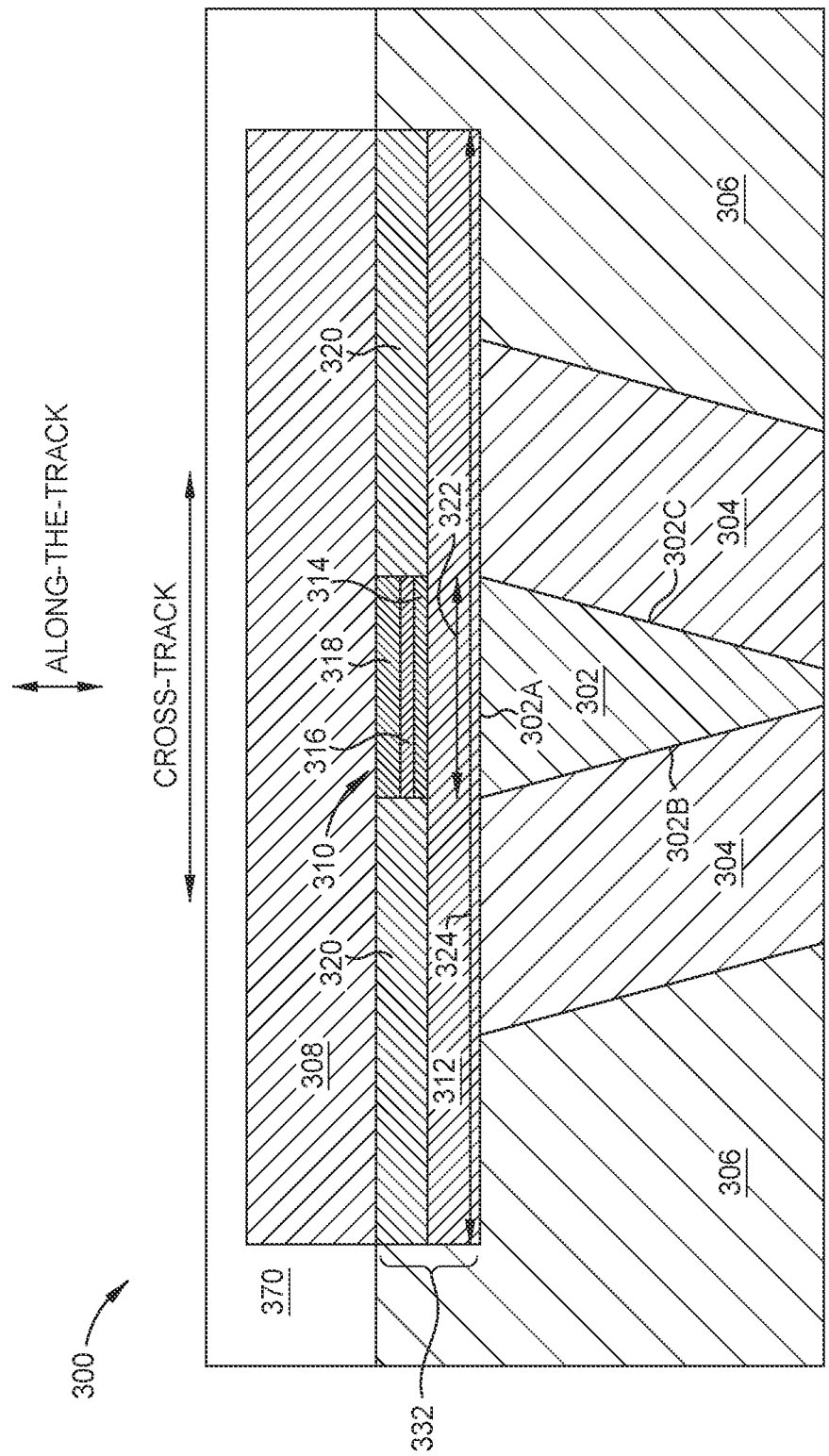
Figure 3B:
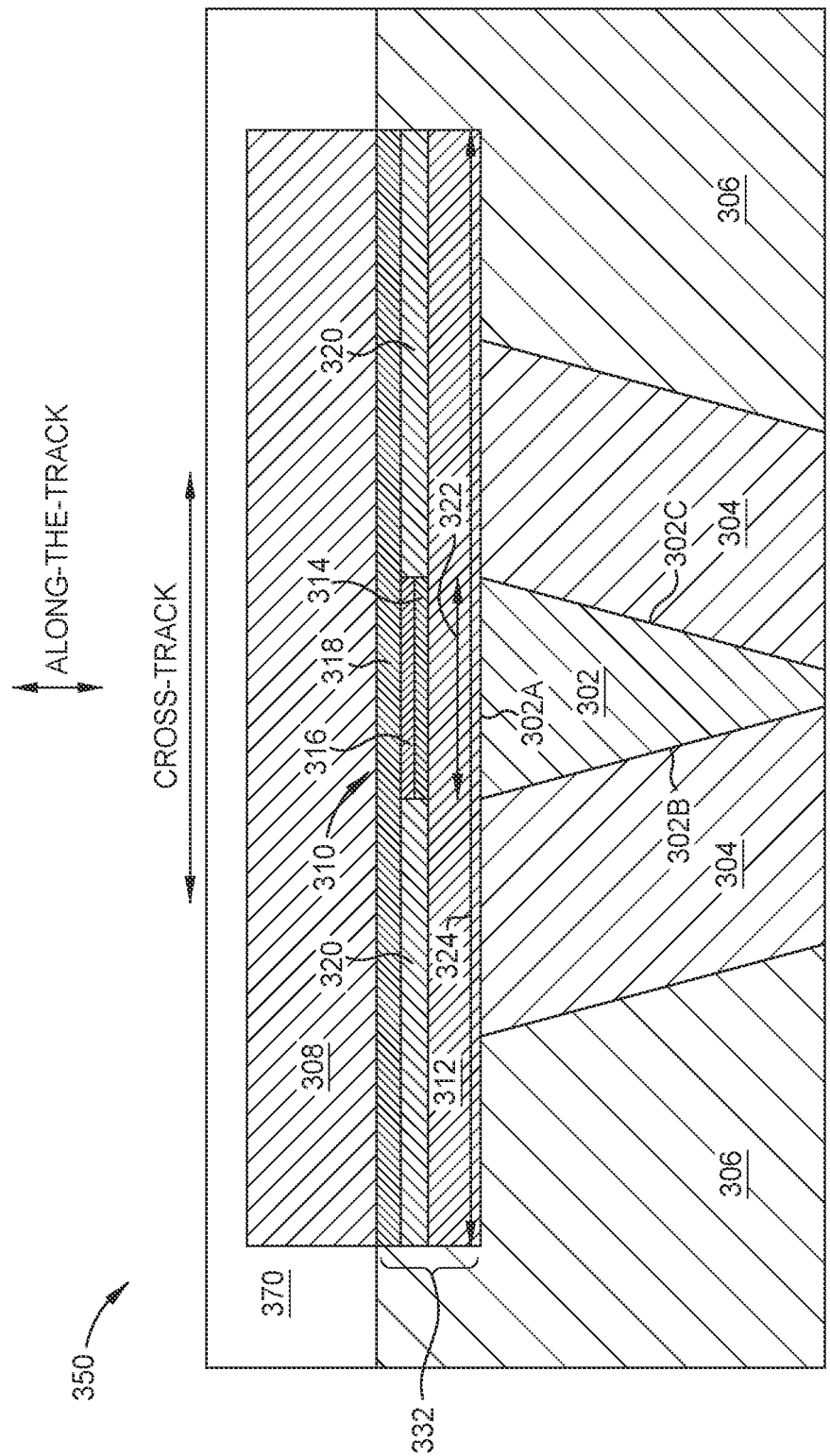
Figure 3C:
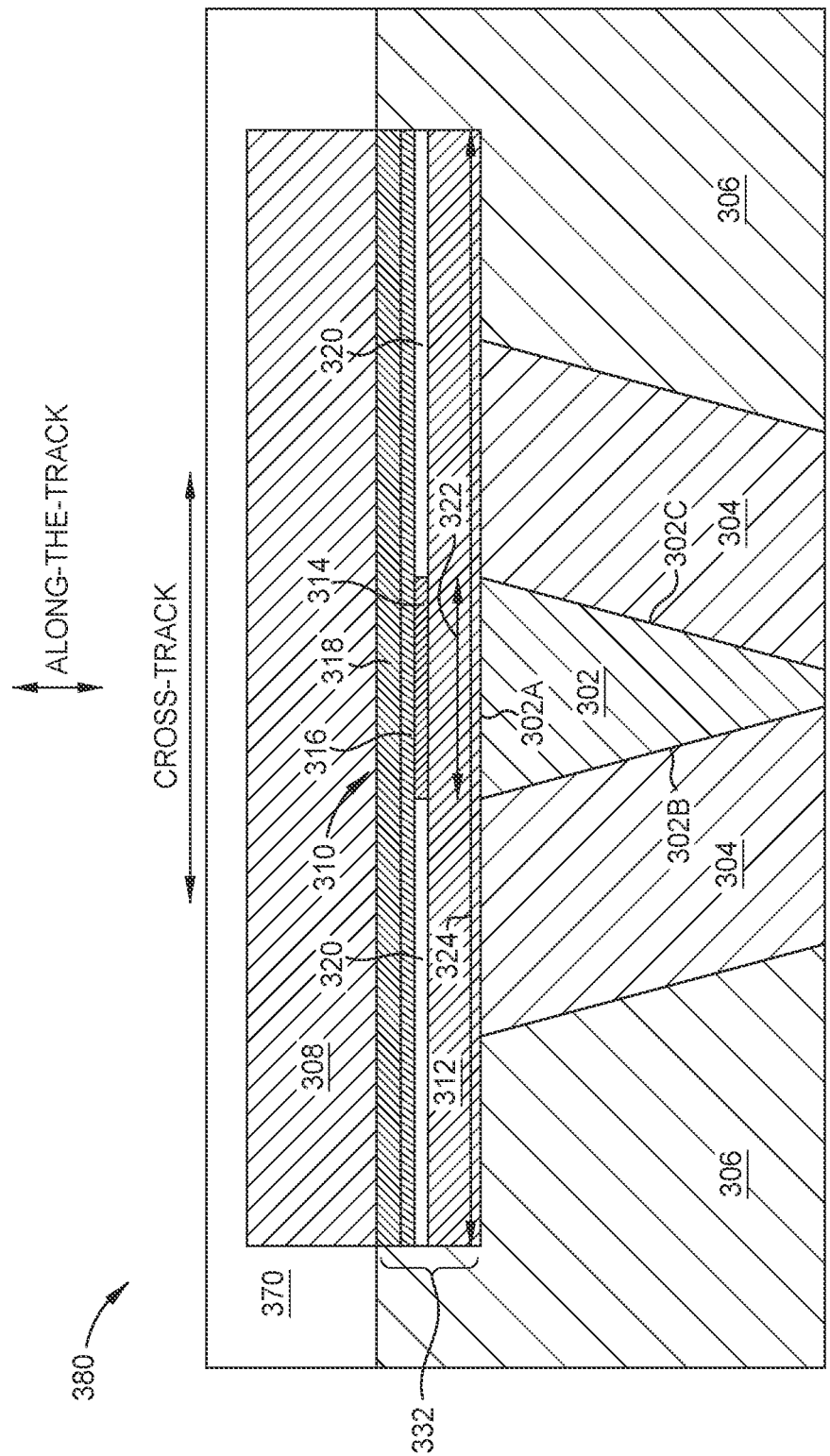

FIGS. 3A-3C illustrate MFS views of magnetic recording heads 300, 350, 380, respectively, having write assist stacks 310 comprised of layers of varying widths, according to various embodiments. Each of the magnetic recording heads 300, 350, 380 may individually correspond to the magnetic head assembly 121 described in FIG. 1 and/or the read/write head 200 described in FIG. 2. Each of the magnetic recording heads 300, 350, 380 comprises a write assist stack 310 disposed at the MFS within a trailing gap 332 between a hot seed layer 308 and a first surface 302A of a main pole 302. The first surface 302A of the main pole 302 is the interface between the main pole 302 and the trailing gap 332. A trailing shield 370 is disposed above the hot seed layer 308. A side gap 304 is disposed adjacent to two or more surfaces 302B, 302C of the main pole 302, and a side shield 306 is disposed around the side gap 304. An electrically insulating layer 320 is disposed on either side of the write assist stack 310. The electrically insulating layer 320 may be recessed from the MFS by about 20 nm to about 80 nm.

The write assist stack 310 of each magnetic recording head 300, 350, 380 comprises a seed layer 312 disposed adjacent to the first surface 302A of the main pole 302, a first layer 314 comprising a spin torque material or a non-magnetic material, such as a spin torque layer (STL) 314, disposed on the seed layer 312, a spacer layer 316 disposed on the STL 314, and a notch layer 318 disposed between the spacer layer 316 and the hot seed layer 308. The notch layer 318 provides torque to the STL 314. The write assist stack 310 is a forward stack write assist stack. When voltage is applied to the magnetic recording heads 300, 350, 380, electrons flow through the write assist stack 310 from the main pole 302 to the hot seed layer 308. In some embodiments, the first layer 314 is a non-magnetic, electrically conductive layer, such as a layer comprising Ru, Cu, Cr, Ta, Au, NiCr, NiFeTa, NiTa, or NiAl, for example.

FIG. 3A illustrates an MFS view of the magnetic recording head 300, according to one embodiment. In the magnetic recording head 300, the seed layer 312 has a first cross-track width 324 that is greater than the second cross-track width 322 of the STL 314. The STL 314, the spacer layer 316, and the notch layer 318 each have the same second cross-track width 322.

FIG. 3B illustrates an MFS view of the magnetic recording head 350, according to another embodiment. In the magnetic recording head 350, the STL 314 and the spacer layer 316 each have the same second cross-track width 322. The seed layer 312 and the notch layer 318 each have the first cross-track width 324 that is greater than the second cross-track width 322 of the STL 314 and the spacer layer 316. In one embodiment, the seed layer 312 has the same cross-track width 322 as the STL 314 while only the notch layer 318 has the first cross-track width 324.

FIG. 3C illustrates an MFS view of the magnetic recording head 380, according to yet another embodiment. In the magnetic recording head 380, the STL 314 has the second cross-track width 322. The seed layer 312, the notch layer 318, and the spacer layer 316 each have the first cross-track width 324 that is greater than the second cross-track width 322 of the STL 314. In one embodiment, the seed layer 312 has the same second cross-track width 322 as the STL 314 while only the notch layer 318 and the spacer layer 316 have the first cross-track width 324. In another embodiment, the seed layer 312 and the notch layer 318 have the same second cross-track width 322 as the STL 314 while only the spacer layer 316 has the first cross-track width 324. In yet another embodiment, the notch layer 318 has the same second cross-track width 322 as the STL 314 while only the seed layer 312 and the spacer layer 316 have the first cross-track width 324.

For each of the magnetic recording heads 300, 350, 380, the second cross-track width 322 may be any width less than or equal to the cross-track width of the first surface 302A of the main pole 302. The second cross-track width 322 may be about 150 nm to about 400 nm. The first cross-track width 324 may extend to the side shields 306 (i.e., have the same cross-track width as the hot seed layer 308). The first cross-track width 324 may be any width greater than the second cross-track width 322 but less than or equal to the cross-track width of the hot seed layer 308. The first cross-track width 324 may be greater than or equal to the cross-track width of the first surface 302A of the main pole 302. The first cross-track width 324 may be about 150 nm to about 400 nm. In embodiments where the side shield 306 and the trailing shield 370 are magnetically coupled in either of the magnetic recording heads 300, 350, 380, the seed layer 312 cannot have a cross-track width that extends passed the side gap 304 to contact the side shield 306 on either side of the main pole 302. Additionally, while the ends of the seed layer 312, the spacer layer 316, and the notch layer 318 are shown to be squared off, the ends of one or more of the seed layer 312, the spacer layer 316, and the notch layer 318 may be tapered.

For each of the magnetic recording heads 300, 350, 380, the electrically insulating layer 320 may comprise an insulating material or a non-conductive material. For example, if the electrically insulating layer 320 comprises an insulating material, aluminum or aluminum oxide may be used. If the electrically insulating layer 320 comprises a non-conductive material, aluminum nitride or silicon nitride may be used. The non-conductive material is configured to act as a heat sink, and is thermally conductive.

While the seed layer 312, the notch layer 318, and/or the spacer layer 316 may each have the first cross-track width 324, the STL 314 is limited to the second cross-track width 322 and may not have the first cross-track width 324. By extending the width of at least one of the seed layer 312, the notch layer 318, and the spacer layer 316, the layer(s) having the extended cross-track width dissipates heat away from the main pole 302, lowering the resistance of the magnetic recording heads 300, 350, 380 and reducing temperature increases. Additionally, utilizing a non-conductive material for the electrically insulating layer 320 further lowers the resistance of the magnetic recording heads 300, 350, 380 and reduces temperature increases.

FIGS. 3D-3E illustrate cross-sectional views of the magnetic recording head 300 of FIG. 3A, according to various embodiments. FIGS. 3D-3E illustrate the main pole 302 disposed between the trailing shield 370 and a leading gap 352. The leading gap 352 is disposed adjacent to a leading shield 354. As shown in FIG. 3D, according to one embodiment, the seed layer 312 may have a first stripe height 344 into the magnetic recording head 300 in the z-direction (e.g., from the MFS 340 to a plane or surface 342 recessed from the MFS 340) greater than a second stripe height 346 of one or more layers 314, 316, 318 of the write assist stack 310. For example, the STL 314, the spacer layer 316, and/or the notch layer 318 may each have a same or equal second stripe height 346, or the seed layer 312, the STL 314, and the spacer layer 316 may have a same or equal first stripe height 344. In such an embodiment, the write assist stack 310 may be partially milled such that one or more of the STL 314, the spacer layer 316, and the notch layer 318 have a shorter second stripe height 346 than the first stripe height 344 of the seed layer 312. By extending the first stripe height 344 of at least the seed layer 312, the ability of the seed layer 312 to dissipate heat away from the main pole 302 may be improved.

In another embodiment where the first layer 314 is a non-magnetic, electrically conductive layer (e.g., a layer comprising Ru, Cu, Cr, Ta, Au, NiCr, NiFeTa, NiTa, or NiAl), at least the seed layer 312 and the non-magnetic, electrically conductive layer may have the first stripe height 344 while the notch layer 318 and/or the spacer layer 316 have the second stripe height 346. In such an embodiment, the non-magnetic, electrically conductive layer may further have the first cross-track width 324, as shown in FIGS. 3A-3C.

In another embodiment, as shown in FIG. 3E, the write assist stack 310 may be fully milled such that each layer of the write assist stack 310 (e.g., the seed layer 312, the STL 314, the spacer layer 316, and the notch layer 318) has a same or equal third stripe height 348. In yet another embodiment, the stripe height (not shown) of the notch layer 318 and/or the spacer layer 316 may be greater than a stripe height of the STL 314. In such an embodiment, the seed layer 312 may have a stripe height equal to the notch layer 318 and/or the spacer layer 316, or equal to the STL 314. For example, in the magnetic recording head 350 of FIG. 3B, the notch layer 318 and the seed layer 312 may each individually have a greater stripe height than the STL 314. In in the magnetic recording head 380, the spacer layer 316, the notch layer 318, and the seed layer 312 may each individually have a greater stripe height than the STL 314.

Figure 4:
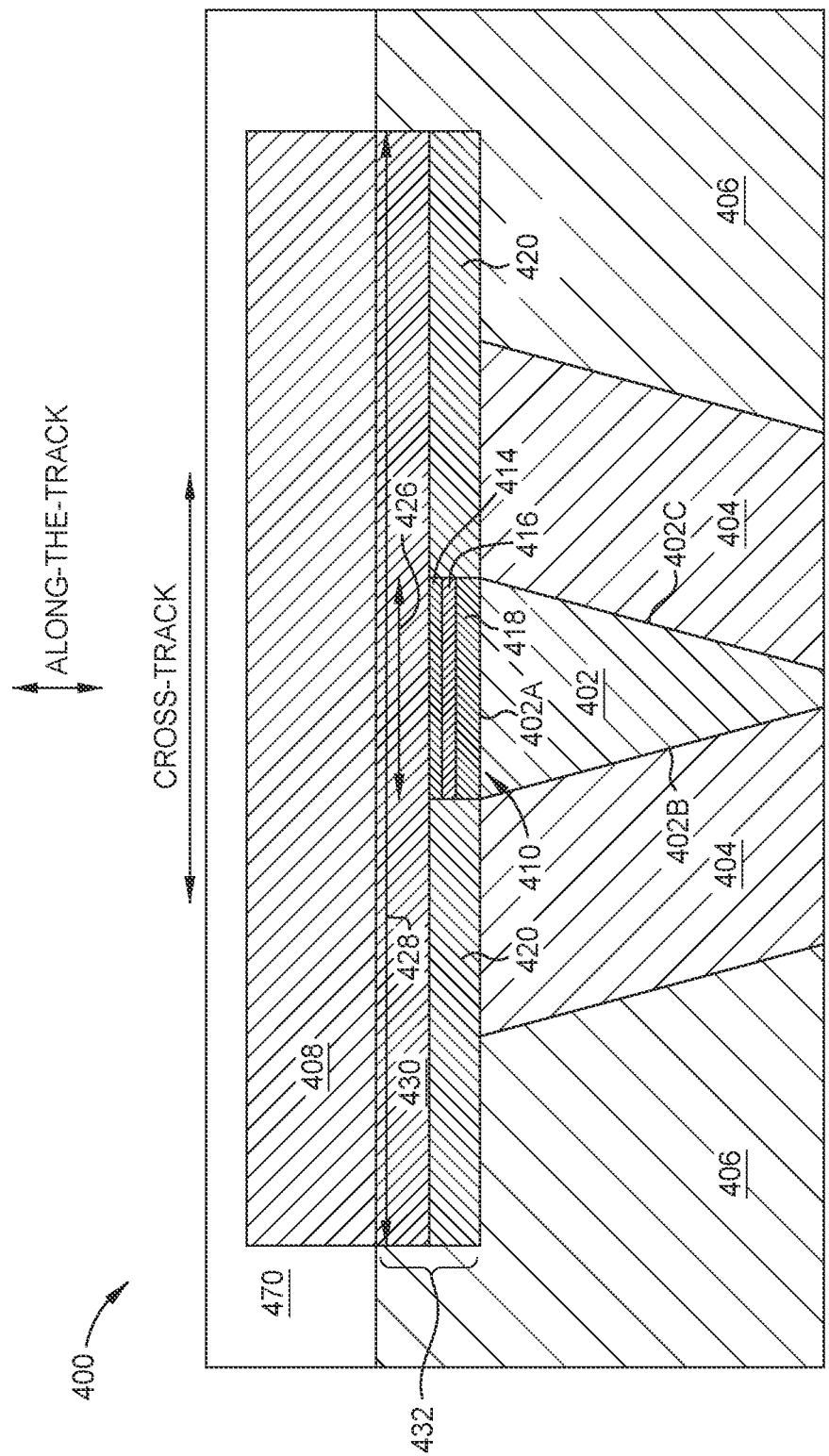
FIG. 4 illustrates MFS view of a magnetic recording head having a reverse stack spin torque oscillator, according to one embodiment.

FIG. 4 illustrates a MFS view of a magnetic recording head 400 having a reverse write assist stack 410, according to one embodiment. The magnetic recording head 400 may correspond to the magnetic head assembly 121 described in FIG. 1 and/or the read/write head 200 described in FIG. 2. The magnetic recording head 400 comprises a write assist stack 410 disposed at the MFS within a trailing gap 432 between a hot seed layer 408 and a first surface 402A of a main pole 402. The first surface 402A of the main pole 402 is the interface between the main pole 402 and the trailing gap 432. A trailing shield 470 is disposed above the hot seed layer 408. A side gap 404 is disposed adjacent to two or more surfaces 402B, 402C of the main pole 402, and a side shield 406 is disposed around the side gap 404. An electrically insulating layer 420 is disposed on either side of the write assist stack 410. The electrically insulating layer 420 may be recessed from the MFS by about 20 nm to about 80 nm.

The write assist stack 410 comprises a notch layer 418 disposed adjacent to the first surface 402A of the main pole 402, a spacer layer 416 disposed on the notch layer 418, a first layer 414 comprising a spin torque material or a non-magnetic material, such as a STL 414 disposed on the spacer layer 416, and a cap layer 430 disposed between the STL 414 and the hot seed layer 408. The notch layer 418 provides torque to the STL 414. When voltage is applied to the magnetic recording head 400, electrons flow through the write assist stack 410 from the hot seed layer 408 to the main pole 402. In some embodiments, the first layer 414 is a non-magnetic, electrically conductive layer, such as a layer comprising Ru, Cu, Cr, Ta, Au, NiCr, NiFeTa, NiTa, or NiAl, for example.

In the magnetic recording head 400, the cap layer 430 of the write assist stack 410 has a first cross-track width 428 greater than a second cross-track width 426 of the STL 414. As shown in FIG. 4, the notch layer 418 and the spacer layer 416 each have the same second cross-track width 426 as the STL 414. However, the spacer layer 416 may have the same first cross-track width 428 as the cap layer 430. Thus, the cap layer 430 and the spacer layer 416 may each have the first cross-track width 428 while the STL 414 and the notch layer 418 have the second cross-track width 426. In embodiments where the STL 414 is replaced with a non-magnetic, electrically conductive layer, the non-magnetic, electrically conductive layer and the cap layer 430 may each have the first cross-track width 428 greater than a second cross-track width 426 of the notch layer 418 and/or the spacer layer 416.

Additionally, in one embodiment, the cap layer 430 and/or the spacer layer 416 each individually have a greater stripe height from the MFS to a surface recessed from the MFS than the STL 414, similar to as described in FIG. 3D above. In another embodiment, the cap layer 430 and/or the spacer layer 416 each have a stripe height equal to a stripe height of the STL 414, similar to as described in FIG. 3E above. In yet another embodiment where the first layer 414 is a non-magnetic, electrically conductive layer (e.g., a layer comprising Ru, Cu, Cr, Ta, Au, NiCr, NiFeTa, NiTa, or NiAl), at least the cap layer 430 and the first layer 414 comprising the non-magnetic, electrically conductive material may each have a first stripe height greater than a second stripe height of the notch layer 418 and/or the spacer layer 416.

While the notch layer 418 is not limited to having the same second cross-track width 426 as the STL 414, the notch layer 418 may not have a cross-track width exceeding the cross-track width of the first surface 402A of the main pole 402. In one embodiment, the cap layer 430, the STL 414, and the notch layer 418 each have the second cross-track width 426 while only the spacer layer 416 has the first cross-track width 428.

The first cross-track width 428 may extend to the side shields 406 (i.e., have the same cross-track width as the hot seed layer 408). The first cross-track width 428 may be any width greater than the second cross-track width 426, but less than or equal to the cross-track width of the hot seed layer 408. The first cross-track width 428 may be greater than or equal to the cross-track width of the first surface 402A of the main pole 402. The first cross-track width 428 may be about 150 nm to about 400 nm. The second cross-track width 426 may be any width less than or equal to the cross-track width of the first surface 402A of the main pole 402. The second cross-track width 426 may be about 150 nm to about 400 nm. Additionally, while the ends of the cap layer 430, the spacer layer 416, and the notch layer 418 are shown to be squared off, the ends of one or more of the cap layer 430, the spacer layer 416, and the notch layer 418 may be tapered.

The electrically insulating layer 420 may comprise an insulating material or a non-conductive material. For example, if the electrically insulating layer 420 comprises an insulating material, aluminum or aluminum oxide may be used. If the electrically insulating layer 420 comprises a non-conductive material, aluminum nitride or silicon nitride may be used. The non-conductive material is configured to act as a heat sink, and is thermally conductive.

While the cap layer 430 and/or the spacer layer 416 may each have the first cross-track width 428, the STL 414 is limited to the second cross-track width 426 and may not have the first cross-track width 428. By extending the width of at least the cap layer 430, the cap layer 430 dissipates heat away from the main pole 402, lowering the resistance of the magnetic recording head 400 and reducing temperature increases. Additionally, utilizing a non-conductive material for the electrically insulating layer 420 further lowers the resistance of the magnetic recording head 400 and reduces temperature increases.

Figure 5A:
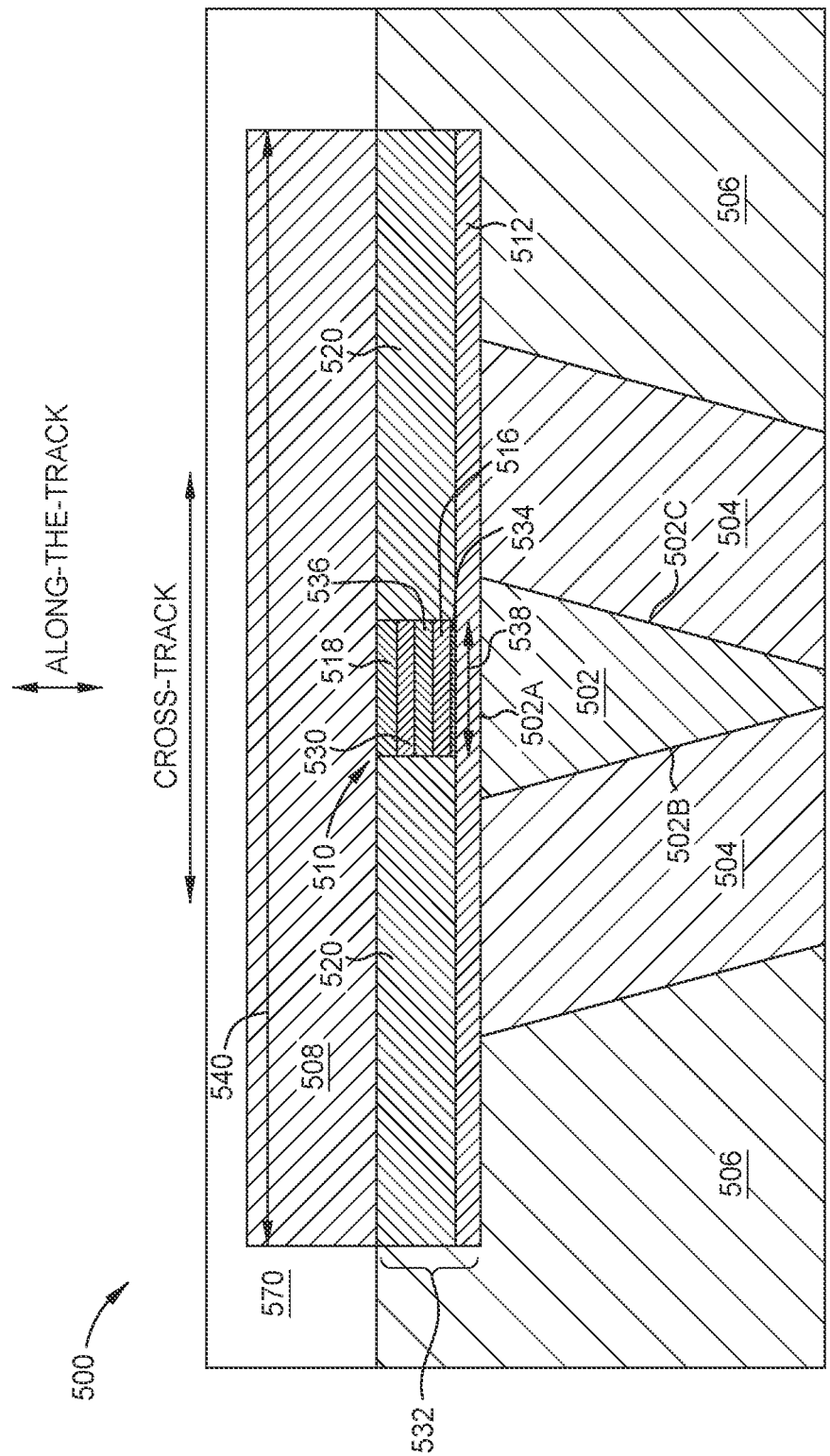
FIGS. 5A-5C illustrate MFS views of magnetic recording heads having spin torque oscillators comprised of layers of varying widths, according to various embodiments.
Figure 5B:
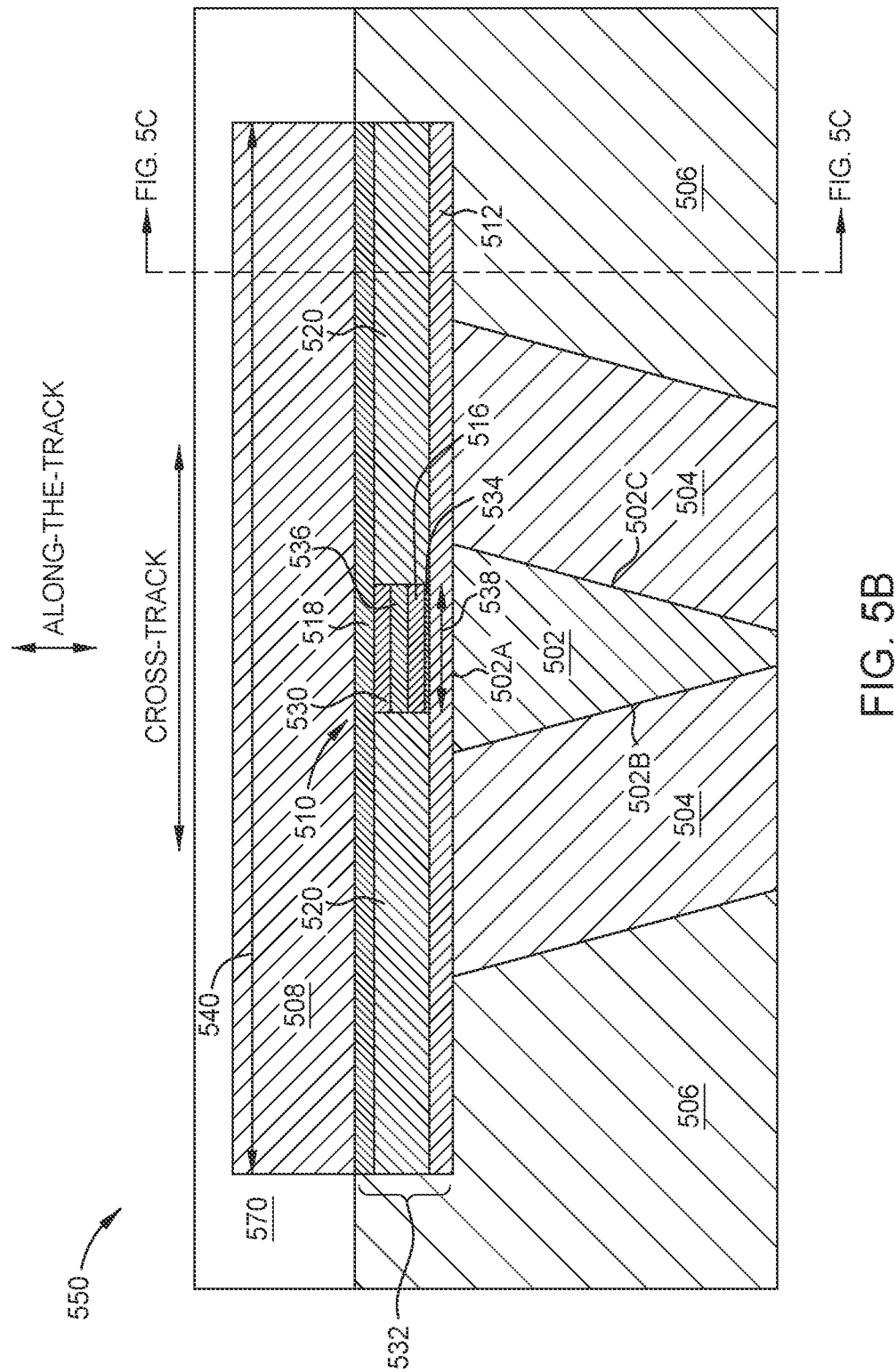
Figure 5C:
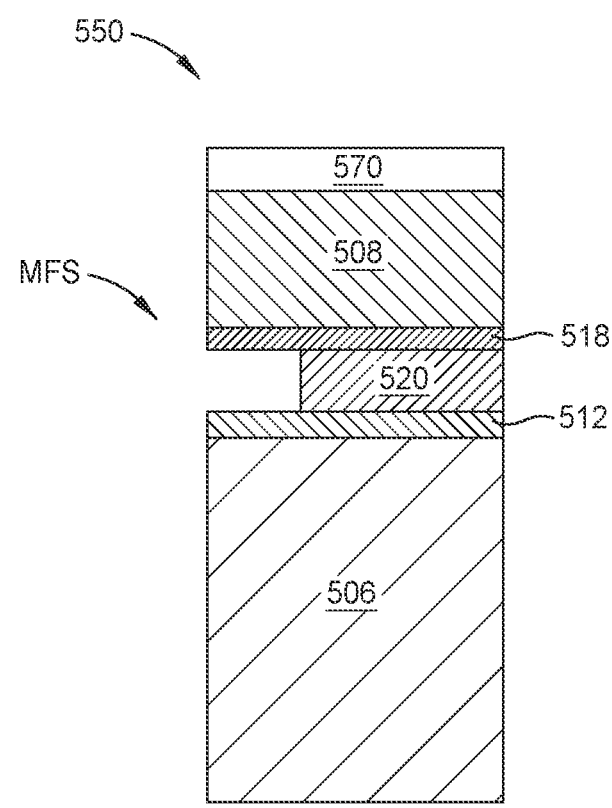

FIGS. 5A-5B illustrate MFS views of magnetic recording heads 500, 550, respectively, having write assist stacks, such as spin torque oscillators (STOs) 510 comprised of layers of varying widths, according to various embodiments. FIG. 5C is a cross-sectional view of the magnetic recording head 550 of FIG. 5B along the dotted line labeled "FIG. 5C" in FIG. 5B. Each of the magnetic recording heads 500, 550 may individually correspond to the magnetic head assembly 121 described in FIG. 1 and/or the read/write head 200 described in FIG. 2. Each of the magnetic recording heads 500, 550 comprises an STO 510 disposed at the MFS within a trailing gap 532 between a hot seed layer 508 and a first surface 502A of a main pole 502. The first surface 502A of the main pole 502 is the interface between the main pole 502 and the trailing gap 532. A trailing shield 570 is disposed above the hot seed layer 508. A side gap 504 is disposed adjacent to two or more surfaces 502B, 502C of the main pole 502, and a side shield 506 is disposed around the side gap 504. An electrically insulating layer 520 is disposed on either side of the STO 510. The electrically insulating layer 520 may be recessed from the MFS by about 20 nm to about 80 nm, like shown in FIG. 5C.

The STO 510 of each magnetic recording head 500, 550 comprises a seed layer 512 disposed adjacent to the first surface 502A of the main pole 502, a spin polarization layer (SPL) 534 disposed on the seed layer 512, a spacer layer 516 disposed on the SPL 534, a field generation layer (FGL) 536 disposed on the spacer layer 516, a cap layer 530 disposed on the FGL 536, and a notch layer 518 disposed between the cap layer 530 and the hot seed layer 508. In one embodiment, the cap layer 530 is a second spacer layer utilized to activate the notch layer 518. The STO 510 is a forward stack STO. When voltage is applied to the magnetic recording heads 500, 550, electrons flow through the STO 510 from the main pole 502 to the hot seed layer 508. In some embodiments, at least one of the SPL 534 and the FGL 536 may be replaced with a non-magnetic, electrically conductive layer, such as a layer comprising Ru, Cu, Cr, Ta, Au, NiCr, NiFeTa, NiTa, or NiAl, for example.

In the magnetic recording head 500, the seed layer 512 has a first cross-track width 540 greater than a second cross-track width 538 of the SPL 534 and/or the FGL 536. As shown in FIG. 5A, the notch layer 518, the spacer layer 516, and the cap layer 530 each have the same second cross-track width 538 as the SPL 534 and the FGL 536. In embodiments where at least one of the SPL 534 and/or the FGL 536 is replaced with a non-magnetic, electrically conductive layer, the non-magnetic, electrically conductive layer and the seed layer 512 may each have the first cross-track width 540 greater than a second cross-track width 538 of the notch layer 518, the cap layer 530, and/or the spacer layer 516.

In one embodiment, the seed layer 512 has a greater stripe height from the MFS to a surface recessed from the MFS than the SPL 534 and/or the FGL 536, similar to as described in FIG. 3D above. In another embodiment, the seed layer 512 has a stripe height equal to a stripe height of the SPL 534 and/or the FGL 536, similar to as described in FIG. 3E above. In yet another embodiment where at least one of the SPL 534 and/or the FGL 536 is replaced with a non-magnetic, electrically conductive layer (e.g., a layer comprising Ru, Cu, Cr, Ta, Au, NiCr, NiFeTa, NiTa, or NiAl), at least the seed layer 512 and the non-magnetic, electrically conductive layer may each have a first stripe height greater than a second stripe height of the notch layer 518, the cap layer 530, and/or the spacer layer 516.

In the magnetic recording head 550, the seed layer 512 and the notch layer 518 each have the first cross-track width 540 greater than a second cross-track width 538 of the SPL 534 and/or the FGL 536. As shown in FIG. 5B, the spacer layer 516 and the cap layer 530 each have the same second cross-track width 538 as the SPL 534 and the FGL 536. In embodiments where at least one of the SPL 534 and/or the FGL 536 is replaced with a non-magnetic, electrically conductive layer, the non-magnetic, electrically conductive layer, the seed layer 512, and the notch layer 518 may each have the first cross-track width 540 greater than a second cross-track width 538 of the cap layer 530 and/or the spacer layer 516.

In one embodiment, the seed layer 512 and/or the notch layer 518 each individually have a greater stripe height from the MFS to a surface recessed from the MFS than the SPL 534 and the FGL 536, similar to as described in FIG. 3D above. In another embodiment, the seed layer 512 and/or the notch layer 518 have a stripe height equal to a stripe height of the SPL 534 and the FGL 536, similar to as described in FIG. 3E above. In yet another embodiment where at least one of the SPL 534 and/or the FGL 536 is replaced with a non-magnetic, electrically conductive layer (e.g., a layer comprising Ru, Cu, Cr, Ta, Au, NiCr, NiFeTa, NiTa, or NiAl), at least the seed layer 512, the non-magnetic, electrically conductive layer, and the notch layer 518 may each have a first stripe height greater than a second stripe height of the cap layer 530 and/or the spacer layer 516.

In both the magnetic recording heads 500, 550, the spacer layer 516 and the cap layer 530 may each individually have the first cross-track width 540. Thus, in one embodiment of the magnetic recording head 500, the seed layer 512 and the spacer layer 516 may have the first cross-track width 540 while the cap layer 530, the notch layer 518, the SPL 534, and the FGL 536 have the second cross-track width 538. In another embodiment of the magnetic recording head 500, the seed layer 512 and the cap layer 530 may have the first cross-track width 540 while the seed layer 512, the notch layer 518, the SPL 534, and the FGL 536 have the second cross-track width 538. In yet another embodiment of the magnetic recording head 500, the seed layer 512, the spacer layer 516, and the cap layer 530 may have the first cross-track width 540 while the notch layer 518, the SPL 534, and the FGL 536 have the second cross-track width 538.

Similarly, in one embodiment of the magnetic recording head 550, the seed layer 512, the notch layer 518, and the spacer layer 516 may each have the first cross-track width 540 while the cap layer 530, the SPL 534, and the FGL 536 have the second cross-track width 538. In another embodiment of the magnetic recording head 550, the seed layer 512, the notch layer 518, and the cap layer 530 may each have the first cross-track width 540 while the seed layer 512, the SPL 534, and the FGL 536 have the second cross-track width 538. In yet another embodiment of the magnetic recording head 550, the seed layer 512, the notch layer 518, the spacer layer 516, and the cap layer 530 may each have the first cross-track width 540 while the SPL 534 and the FGL 536 have the second cross-track width 538.

In both the magnetic recording heads 500, 550, the first cross-track width 540 may extend to the side shields 506 (i.e., have the same cross-track width as the hot seed layer 508). The first cross-track width 540 may be any width greater than the second cross-track width 538, but less than or equal to the cross-track width of the hot seed layer 508. The first cross-track width 540 may be greater than or equal to the cross-track width of the first surface 502A of the main pole 502. The first cross-track width 540 may be about 150 nm to about 400 nm. The second cross-track width 538 may be any width less than or equal to the cross-track width of the first surface 502A of the main pole 502. The second cross-track width 538 may be about 150 nm to about 400 nm. In embodiments where the side shield 506 and the trailing shield 570 are magnetically coupled in either of the magnetic recording heads 500, 550, the seed layer 512 cannot have a cross-track width that extends past the side gap 504 to contact the side shield 506 on either side of the main pole 502. Additionally, while the ends of the seed layer 512, the cap layer 530, the spacer layer 516, and the notch layer 518 are shown to be squared off, the ends of one or more of the seed layer 512, the cap layer 530, the spacer layer 516, and the notch layer 518 may be tapered.

Moreover, for each of the magnetic recording heads 500, 550, the electrically insulating layer 520 may comprise an insulating material or a non-conductive material. For example, if the electrically insulating layer 520 comprises an insulating material, aluminum or aluminum oxide may be used. If the electrically insulating layer 520 comprises a non-conductive material, aluminum nitride or silicon nitride may be used. The non-conductive material is configured to act as a heat sink, and is thermally conductive.

While one or more of the seed layer 512, the notch layer 518, the spacer layer 516, and the cap layer 530 may have the first cross-track width 540, the SPL 534 and the FGL 536 are both limited to the second cross-track width 538 and may not have the first cross-track width 540. By extending the width of at least the seed layer 512 or the seed layer 512 and the notch layer 518, the extended layer(s) dissipates heat away from the main pole 502, lowering the resistance of the magnetic recording head 550 and reducing temperature increases. Additionally, utilizing a non-conductive material for the electrically insulating layer 520 further lowers the resistance of the magnetic recording heads 500, 550 and reduces temperature increases.

Figure 6:
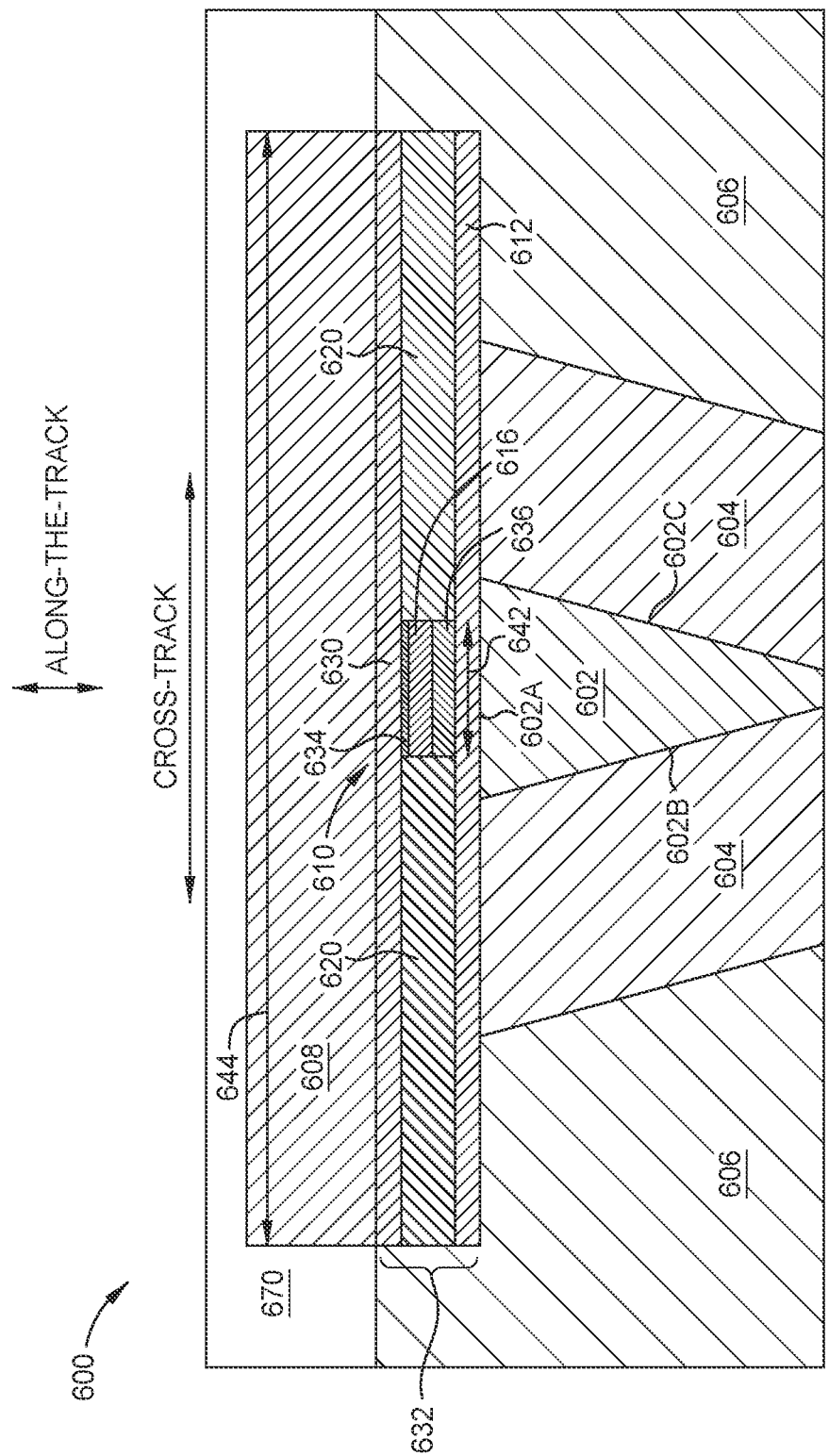
FIG. 6 illustrates an MFS view of a magnetic recording head having a reverse stack spin torque oscillator, according to another embodiment.

FIG. 6 illustrates a MFS view of a magnetic recording head 600 having a reverse write assist stack, such as a reverse stack STO 610, according to another embodiment. The magnetic recording head 600 may correspond to the magnetic head assembly 121 described in FIG. 1 and/or the read/write head 200 described in FIG. 2. The magnetic recording head 600 comprises an STO 610 disposed at the MFS within a trailing gap 632 between a hot seed layer 608 and a first surface 602A of a main pole 602. The first surface 602A of the main pole 602 is the interface between the main pole 602 and the trailing gap 632. A trailing shield 670 is disposed above the hot seed layer 608. A side gap 604 is disposed adjacent to two or more surfaces 602B, 602C of the main pole 602, and a side shield 606 is disposed around the side gap 604. An electrically insulating layer 620 is disposed on either side of the STO 610. The electrically insulating layer 620 may be recessed from the MFS by about 20 nm to about 80 nm.

The STO 610 comprises a seed layer 612 disposed adjacent to the first surface 602A of the main pole 602, an FGL 636 disposed on the seed layer 612, a spacer layer 616 disposed on the FGL 636, an SPL 634 disposed on the spacer layer 616, and a cap layer 630 disposed between the SPL 634 and the hot seed layer 608. When voltage is applied to the magnetic recording head 600, electrons flow through the STO 610 from the hot seed layer 608 to the main pole 602. In some embodiments, the SPL 634 and/or the FGL 636 may be replaced with a non-magnetic, electrically conductive layer, such as a layer comprising Ru, Cu, Cr, Ta, Au, NiCr, NiFeTa, NiTa, or NiAl, for example.

In the magnetic recording head 600, the seed layer 612 and the cap layer 630 each have a first cross-track width 644 greater than a second cross-track width 642 of the SPL 634 and/or the FGL 636. As shown in FIG. 6, the spacer layer 616 has the same second cross-track width 642 as the SPL 634 and the FGL 636. However, the spacer layer 616 may have the same first cross-track width 644 as the seed layer 612 and the cap layer 630. Thus, only the SPL 634 and/or the FGL 636 are required to have the second cross-track width 642. In embodiments where at least one of the SPL 634 and/or the FGL 636 is replaced with a non-magnetic, electrically conductive layer, the non-magnetic, electrically conductive layer, the seed layer 612, and the cap layer 630 may each have the first cross-track width 644 greater than a second cross-track width 642 of the spacer layer 616.

In one embodiment, the seed layer 612 and/or the cap layer 630 each individually have a greater stripe height from the MFS to a surface recessed from the MFS than the SPL 634 and the FGL 636, similar to as described in FIG. 3D above. The spacer layer 616 may have a stripe height equal to the seed layer 612 and/or the cap layer 630, or the spacer layer 616 may have a stripe height equal to the SPL 634 and the FGL 636. In another embodiment, the seed layer 612 and/or the cap layer 630 have a stripe height equal to a stripe height of the SPL 634 and the FGL 636, similar to as described in FIG. 3E above. In yet another embodiment where at least one of the SPL 634 and/or the FGL 636 is replaced with a non-magnetic, electrically conductive layer (e.g., a layer comprising Ru, Cu, Cr, Ta, Au, NiCr, NiFeTa, NiTa, or NiAl), at least the seed layer 612, the non-magnetic, electrically conductive layer, and the cap layer 630 may each have a first stripe height greater than a second stripe height of the spacer layer 616.

Moreover, in one embodiment, the seed layer 612 and/or the spacer layer 616 have the first cross-track width 644 while the cap layer 630 has the second cross-track width 642. In another embodiment, the cap layer 630 and/or the spacer layer 616 have the first cross-track width 644 while the seed layer 612 has the second cross-track width 642.

The first cross-track width 644 may extend to the side shields 606 (i.e., have the same cross-track width as the hot seed layer 608). The first cross-track width 644 may be any width greater than the second cross-track width 642, but less than or equal to the cross-track width of the hot seed layer 608. The first cross-track width 644 may be greater than or equal to the cross-track width of the first surface 602A of the main pole 602. The first cross-track width 644 may be about 150 nm to about 400 nm. The second cross-track width 642 may be any width less than or equal to the cross-track width of the first surface 602A of the main pole 602. The second cross-track width 642 may be about 150 nm to about 400 nm. In embodiments where the side shield 606 and the trailing shield 670 are magnetically coupled in the magnetic recording head 600, the seed layer 612 cannot have a cross-track width that extends past the side gap 604 to contact the side shield 606 on either side of the main pole 602. Additionally, while the ends of the seed layer 612, the cap layer 630, and the spacer layer 616 are shown to be squared off, the ends of one or more of the seed layer 612, the cap layer 630, and the spacer layer 616 may be tapered.

The electrically insulating layer 620 may comprise an insulating material or a non-conductive material. For example, if the electrically insulating layer 620 comprises an insulating material, aluminum or aluminum oxide may be used. If the electrically insulating layer 620 comprises a non-conductive material, aluminum nitride or silicon nitride may be used. The non-conductive material is configured to act as a heat sink, and is thermally conductive.

By extending the width of at least the seed layer 612 and the cap layer 630, the seed layer 612 and the cap layer 630 dissipate heat away from the main pole 602, lowering the resistance of the magnetic recording head 600 and reducing temperature increases. Additionally, utilizing a non-conductive material for the electrically insulating layer 620 further lowers the resistance of the magnetic recording head 600 and reduces temperature increases.

Figure 7:
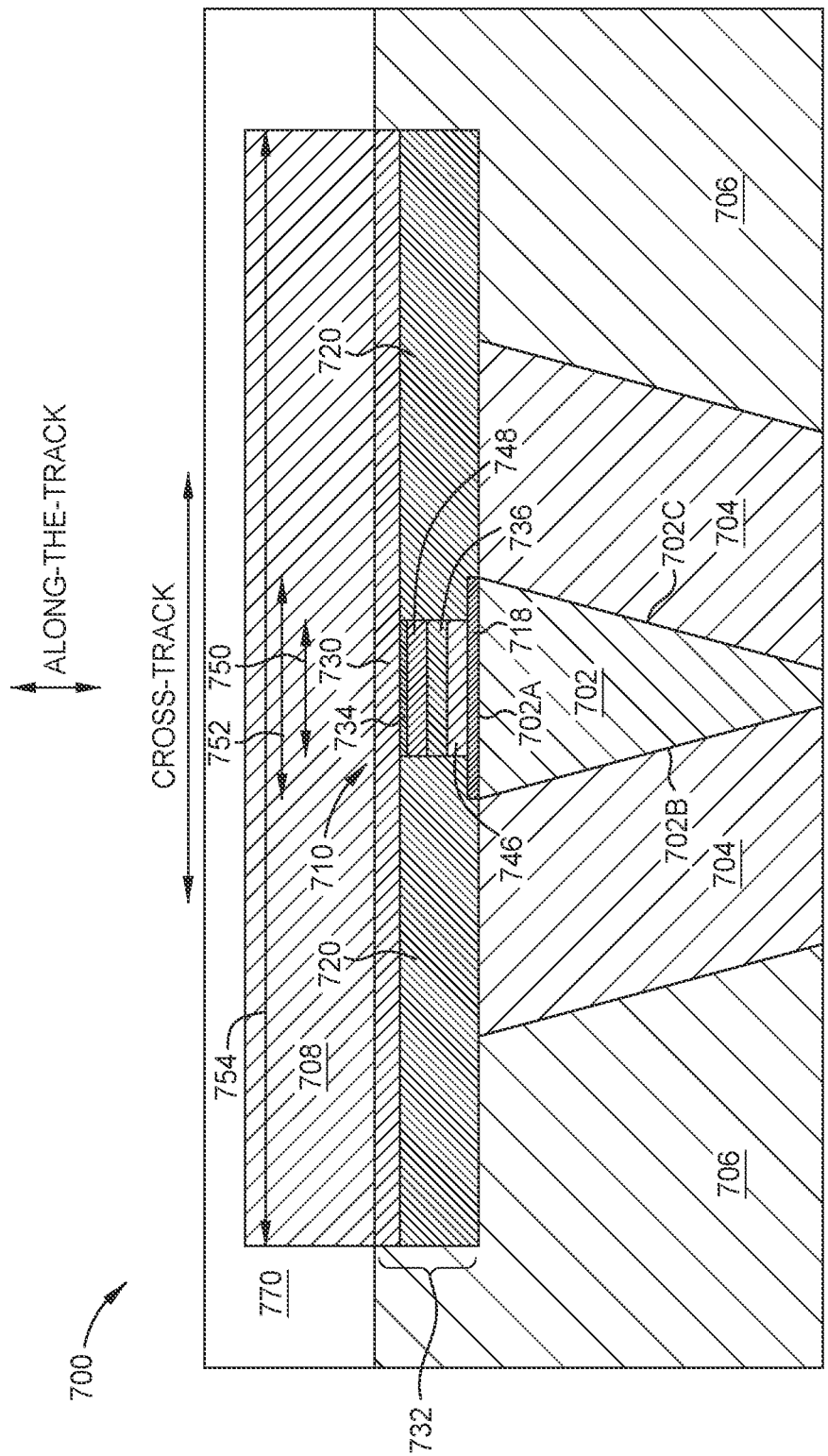
FIG. 7 illustrates an MFS view of a magnetic recording head having a reverse stack spin torque oscillator, according to yet another embodiment.

FIG. 7 illustrates a MFS view of a magnetic recording head 700 having a reverse write assist stack, such as a reverse stack STO 710, according to yet another embodiment. The magnetic recording head 700 may correspond to the magnetic head assembly 121 described in FIG. 1 and/or the read/write head 200 described in FIG. 2. The magnetic recording head 700 comprises an STO 710 disposed at the MFS within a trailing gap 732 between a hot seed layer 708 and a first surface 702A of a main pole 702. The first surface 702A of the main pole 702 is the interface between the main pole 702 and the trailing gap 732. A trailing 770 is disposed above the hot seed layer 708. A side gap 704 is disposed adjacent to two or more surfaces 702B, 702C of the main pole 702, and a side shield 706 is disposed around the side gap 704. An electrically insulating layer 720 is disposed on either side of the STO 710. The electrically insulating layer 720 may be recessed from the MFS by about 20 nm to about 80 nm.

The STO 710 comprises a notch layer 718 disposed adjacent to the first surface 702A of the main pole 702, a first spacer layer 746 disposed on the notch layer 718, an FGL 736 disposed on the first spacer layer 746, a second spacer layer 748 disposed on the FGL 736, an SPL 734 disposed on the second spacer layer 748, and a cap layer 730 disposed between the SPL 734 and the hot seed layer 708. When voltage is applied to the magnetic recording head 700, electrons flow through the STO 710 from the hot seed layer 708 to the main pole 702. In some embodiments, the SPL 734 and/or the FGL 736 may be replaced with a non-magnetic, electrically conductive layer, such as a layer comprising Ru, Cu, Cr, Ta, Au, NiCr, NiFeTa, NiTa, or NiAl, for example.

In the magnetic recording head 700, the cap layer 730 has a first cross-track width 754 greater than a second cross-track width 750 of the SPL 734 and/or the FGL 736. As shown in FIG. 7, the first spacer layer 746 and the second spacer layer 748 each have the same second cross-track width 750 as the SPL 734 and the FGL 736. However, the first spacer layer 746 and the second spacer layer 748 may each independently have the same first cross-track width 754 as the cap layer 730. Thus, only the SPL 734 and/or the FGL 736 are required to have the second cross-track width 750. In embodiments where at least one of the SPL 734 and/or the FGL 736 is replaced with a non-magnetic, electrically conductive layer, the non-magnetic, electrically conductive layer and the cap layer 730 may each have the first cross-track width 754 greater than a second cross-track width 750 of the first and second spacer layers 746, 748.

Additionally, in one embodiment, the cap layer 730 has a greater stripe height from the MFS to a surface recessed from the MFS than the SPL 734 and the FGL 736, similar to as described in FIG. 3D above. In such an embodiment, the first spacer layer 746 and/or the second spacer layer 748 may each individually have a stripe height equal to the stripe height of the cap layer 730. In another embodiment, the cap layer 430, the first spacer layer 746, and the second spacer layer 748 each have a stripe height equal to a stripe height of the SPL 734 and the FGL 736, similar to as described in FIG. 3E above. In yet another embodiment where at least one of the SPL 734 and/or the FGL 736 is replaced with a non-magnetic, electrically conductive layer (e.g., a layer comprising Ru, Cu, Cr, Ta, Au, NiCr, NiFeTa, NiTa, or NiAl), at least the non-magnetic, electrically conductive layer and the cap layer 730 may each have a first stripe height greater than a second stripe height of the first and second spacer layers 746, 748.

The notch layer 718 may have a third cross-track width 752 greater than the second cross-track width 750 of the FGL 736 and the SPL 734, but less than or equal to the cross-track width of the first surface 702A of the main pole 702. The third cross-track width 752 may be about 40 nm to about 70 nm. The notch layer 718 may be conformal with the first surface 702A of the main pole 702. In a reverse stack STO 710, the notch layer 718 may not have a cross-track width exceeding the cross-track width of the first surface 702A of the main pole 702.

The first cross-track width 754 may extend to the side shields 706 (i.e., have the same cross-track width as the hot seed layer 708). The first cross-track width 754 may be any width greater than the second cross-track width 750, but less than or equal to the cross-track width of the hot seed layer 708. The first cross-track width 754 may be greater than or equal to the cross-track width of the first surface 702A of the main pole 702. The first cross-track width 754 may be about 150 nm to about 400 nm. The second cross-track width 750 may be any width less than or equal to the cross-track width of the first surface 702A of the main pole 702. The second cross-track width 750 may be about 150 nm to about 400 nm. Additionally, while the ends of the cap layer 730, the first spacer layer 746, the second spacer layer 748, and the notch layer 718 are shown to be squared off, the ends of one or more of the cap layer 730, the first spacer layer 746, the second spacer layer 748, and the notch layer 718 may be tapered.

The electrically insulating layer 720 may comprise an insulating material or a non-conductive material. For example, if the electrically insulating layer 720 comprises an insulating material, aluminum or aluminum oxide may be used. If the electrically insulating layer 720 comprises a non-conductive material, aluminum nitride or silicon nitride may be used. The non-conductive material is configured to act as a heat sink, and is thermally conductive.

By extending the width of at least the cap layer 730 and the notch layer 718, the cap layer 730 and the notch layer 718 dissipate heat away from the main pole 702, lowering the resistance of the magnetic recording head 700 and reducing temperature increases. Additionally, utilizing a non-conductive material for the electrically insulating layer 720 further lowers the resistance of the magnetic recording head 700 and reduces temperature increases.

In each of the magnetic recording heads 300, 350, 380, 400, 500, 550, 600, 700, the side gaps 304, 404, 504, 604, 704 may be formed of electrically insulating materials, such as alumina or silicon nitride (SiN), and the side shields 306, 406, 506, 606, 706 may be formed of a ferromagnetic material, like a NiFe, CoFe, or NiFeCo alloy. In each of the magnetic recording heads 300, 350, 380, 400, 500, 550, 600, 700, the hot seed layer 308, 408, 508, 608, 708 may comprise CoFe, NiFe, NiFeCo composites having high magnetic saturation (Bs) of 1.0 T to 2.4 T, or a combination thereof, and the seed layer 312, 412, 512, 612, 712 may comprise Cr, Ta, NiCr, NiTa, Ru, NiFeTa, NiAl, or combinations thereof. In each of the magnetic recording heads 300, 350, 380, 400, the STL 314, 414 may comprise NiFe, CMG, CoFe, NiFeCo composites having Bs of 0.5 T to 2.4 T, or combinations thereof. In each of the magnetic recording heads 300, 350, 380, 400, 500, 550, 600, the spacer layer 316, 416, 516, 616 may comprise Cu, Ag, AgSn, or combinations thereof.

In each of the magnetic recording heads 300, 350, 380, 400, 500, 550, 700, the notch layer 318, 418, 518, 718 may comprise CoFe, NiFeCo composites having Bs of 0.5 T to 2.4 T, or combinations thereof. The notch layer 318, 418, 518, 718 may comprise a material having the same magnetic moment as the hot seed layer 308, 408, 508, 708. In each of the magnetic recording heads 500, 550, 600, 700, the FGL 536, 636, 736 may comprise CoFe, or Co and Fe multilayers composites having Bs of 2.0 T to 2.4 T and an anisotropy magnetic field (Hk) of −0.5 T to −1.5 T, or combinations thereof, the SPL 534, 634, 734 may comprise NiFe, CMG, CoFe, or combination of one or more of NiFe, CMG, CoFe having Bs of 0.5 T to 2.0 T, and the cap layer 530, 630, 730 may comprise Ru, Cr, Ta, NiCr, NiTa, Ag, AgSn, Cu, or combinations thereof. In the magnetic recording head 700, the first and second spacer layers 746, 748 may each individually comprise Cu, Ag, AgSn, or combinations thereof.

By extending one or more layers of a write assist stack as described above, the overall resistance of the device is reduced, as the extended one or more layers of the write assist stack dissipate heat away from the main pole. Since the resistance of the magnetic recording heads is lowered, higher amounts of current can be applied without negatively impacting the reliability of the magnetic recording heads, which enhances performance gain of the magnetic recording heads. As such, device resistance and temperature increases are reduced or minimized in each of the above-described magnetic recording head embodiments, preventing materials in the magnetic recording head from corroding and increasing the reliability of the magnetic recording heads.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," Ser. No. 16/365, 034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

In one embodiment, a magnetic recording head comprises a main pole, a hot seed layer disposed above the main pole, and a write assist stack disposed between and in contact with the main pole and the hot seed layer. The write assist stack comprises a notch layer having a first cross-track width and a first layer having a second cross-track width. The first cross-track width is greater than the second cross-track width. The first layer comprises a spin torque material or a non-magnetic, electrically conductive material.

The notch layer may be disposed adjacent to the hot seed layer, and the first cross-track width may be less than or equal to a cross-track width of the hot seed layer. The second cross-track width may be less than a cross-track width of a first surface of the main pole, the first surface of the main pole being adjacent to the write assist stack. The write assist stack further comprise a seed layer. The seed layer may have the first cross-track width. The seed layer may have the second cross-track width. The write assist stack may further comprise a spacer layer, the spacer layer having the first cross-track width. The magnetic recording head may further comprise an electrically insulating layer disposed adjacent to the write assist stack between the hot seed layer and the main pole. The first layer is a spin torque layer comprising the spin torque material. The first layer comprises the non-magnetic, electrically conductive material. The write assist stack may further comprise a cap layer, the cap layer having the first cross-track width. The write assist stack further comprises a spin torque oscillator. The spin torque oscillator comprises the first layer and the notch layer. The first layer is a spin torque layer comprising the spin torque material.

In another embodiment, a magnetic recording head comprises a main pole, a hot seed layer disposed above the main pole, and a write assist stack disposed between and in contact with the main pole and the hot seed layer. The write assist stack comprises a seed layer having a first cross-track width and a spin polarization layer having a second cross-track width. The first cross-track width is greater than the second cross-track width.

The write assist stack may further comprise a cap layer, the cap layer having the first cross-track width. The write assist stack may further comprise a notch layer disposed adjacent to the hot seed layer, the notch layer having the first cross-track width. The write assist stack may further comprise a notch layer disposed adjacent to the main pole, the notch layer having a third cross-track width less than or equal to a width of a first surface of the main pole. The first surface of the main pole is adjacent to the write assist stack. The second cross-track width may be less than a cross-track width of a first surface of the main pole. The write assist stack may further comprise a field generation layer and a spacer layer disposed between the field generation layer and the spin polarization layer, the field generation layer having the second cross-track width. The write assist stack may be a reverse stack spin torque oscillator. The write assist stack further comprises a spin torque oscillator. The spin torque oscillator comprises the spin polarizing layer and the seed layer.

In yet another embodiment, a magnetic recording head comprises a main pole, a hot seed layer disposed above the main pole, and a write assist stack disposed at a media facing surface between and in contact with the main pole and the hot seed layer. The write assist stack comprises a seed layer having a first cross-track width and a spin polarization layer having a second cross-track width. The first cross-track width is greater than the second cross-track width. The magnetic recording head further comprises an electrically insulating layer disposed adjacent to the write assist stack between the hot seed layer and the main pole, the electrically insulating layer comprising a non-conductive material. The electrically insulating layer is recessed from the media facing surface.

The write assist stack may further comprise a notch layer. The notch layer may have the first cross-track width, the notch layer being disposed adjacent to the hot seed layer. The notch layer may have a third cross-track width, the third cross-track width being less than first cross-track width and greater than or equal to the second cross-track width. The notch layer may be disposed adjacent to the main pole. The write assist stack further comprises a spin torque oscillator. The spin torque oscillator comprises the spin polarizing layer and the seed layer.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a main pole;
a hot seed layer disposed above the main pole; and
a write assist stack disposed between and in contact with the main pole and the hot seed layer, the write assist stack comprising a notch layer having a first cross-track width, a seed layer disposed in contact with the main pole, and a first layer having a second cross-track width, wherein:
the first cross-track width is greater than the second cross-track width,
the first layer comprises a spin torque material or a non-magnetic, electrically conductive material, and
wherein the seed layer has a third cross-track width greater than the second cross-track width.

2. The magnetic recording head of claim 1, wherein the notch layer is disposed adjacent to the hot seed layer, and wherein the first cross-track width is less than or equal to a cross-track width of the hot seed layer.

3. The magnetic recording head of claim 1, wherein the second cross-track width is less than a cross-track width of a first surface of the main pole, the first surface of the main pole being adjacent to the write assist stack.

4. The magnetic recording head of claim 1, wherein the first layer is a spin torque layer comprising the spin torque material, wherein the seed layer has the first cross-track width, and wherein the seed layer has a first stripe height greater than a second stripe height of the spin torque layer.

5. The magnetic recording head of claim 1, wherein the first layer is a spin torque layer comprising the spin torque material, wherein the seed layer has the second cross-track width, and wherein the seed layer has a stripe height equal to a stripe height to the spin torque layer.

6. The magnetic recording head of claim 1, wherein the write assist stack further comprises a spacer layer, the spacer layer having the first cross-track width.

7. The magnetic recording head of claim 1, further comprising an electrically insulating layer disposed adjacent to the write assist stack between the hot seed layer and the main pole.

8. The magnetic recording head of claim 1, wherein the first layer comprises the non-magnetic, electrically conductive material.

9. The magnetic recording head of claim 1, wherein the write assist stack further comprises a cap layer, the cap layer having the first cross-track width.

10. The magnetic recording head of claim 1, wherein the write assist stack further comprises a spin torque oscillator, the spin torque oscillator comprising the first layer and the notch layer, wherein the first layer is a spin torque layer comprising the spin torque material.

11. A data storage device comprising the magnetic recording head of claim 1.

12. A magnetic recording head, comprising:
a main pole;
a hot seed layer disposed above the main pole; and
a write assist stack disposed between and in contact with the main pole and the hot seed layer, the write assist stack comprising a seed layer having a first cross-track width and a spin polarization layer having a second cross-track width, wherein the first cross-track width is greater than the second cross-track width.

13. The magnetic recording head of claim 12, wherein the write assist stack further comprises a cap layer, the cap layer having the first cross-track width.

14. The magnetic recording head of claim 12, wherein the write assist stack further comprises a notch layer disposed adjacent to the hot seed layer, the notch layer having the first cross-track width.

15. The magnetic recording head of claim 12, wherein the write assist stack further comprises a notch layer disposed adjacent to the main pole, the notch layer having a third cross-track width less than or equal to a width of a first surface of the main pole, wherein the first surface of the main pole is adjacent to the write assist stack.

16. The magnetic recording head of claim 12, wherein the second cross-track width is less than a cross-track width of a first surface of the main pole, the first surface of the main pole being adjacent to the write assist stack.

17. The magnetic recording head of claim 12, wherein the write assist stack further comprises a field generation layer and a spacer layer, the spacer layer being disposed between the field generation layer and the spin polarization layer, wherein the field generation layer has the second cross-track width, and wherein each layer of the write assist stack as a same stripe height.

18. The magnetic recording head of claim 12, wherein the write assist stack is a reverse write assist stack.

19. The magnetic recording head of claim 12, wherein the write assist stack further comprises a spin torque oscillator, the spin torque oscillator comprising the spin polarizing layer and the seed layer.

20. A data storage device comprising the magnetic recording head of claim 12.

21. A magnetic recording head, comprising:
a main pole;
a hot seed layer disposed above the main pole;
a write assist stack disposed at a media facing surface between and in contact with the main pole and the hot seed layer, the write assist stack comprising a seed layer having a first cross-track width and a spin polarization layer having a second cross-track width, wherein the first cross-track width is greater than the second cross-track width; and
an electrically insulating layer disposed adjacent to the write assist stack between the hot seed layer and the main pole, the electrically insulating layer comprising a non-conductive material, wherein the electrically insulating layer is recessed from the media facing surface.

22. The magnetic recording head of claim 21, wherein the write assist stack further comprises a notch layer.

23. The magnetic recording head of claim 22, wherein the notch layer has the first cross-track width, the notch layer being disposed adjacent to the hot seed layer, and wherein the seed layer has a first stripe height greater than a second stripe height of the spin polarization layer.

24. The magnetic recording head of claim 22, wherein the notch layer has a third cross-track width, the third cross-track width being less than first cross-track width and greater than or equal to the second cross-track width, wherein the notch layer is disposed adjacent to the main pole.

25. The magnetic recording head of claim 21, wherein the write assist stack further comprises a spin torque oscillator, the spin torque oscillator comprising the spin polarizing layer and the seed layer.

26. A data storage device comprising the magnetic recording head of claim 21.

\* \* \* \* \*